US010758330B2

United States Patent
Vermeulen et al.

(10) Patent No.: US 10,758,330 B2
(45) Date of Patent: Sep. 1, 2020

(54) TEETH ILLUMINATION DEVICE WITH A LIGHT CORE

(71) Applicant: KONINKLIJKE PHILIPS N.V., Eindhoven (NL)

(72) Inventors: Olaf Thomas Johan Antonie Vermeulen, Oss (NL); Nigel David Young, Redhill (GB); Pascal Jean Henri Bloemen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/317,971

(22) PCT Filed: Mar. 20, 2018

(86) PCT No.: PCT/EP2018/056921
§ 371 (c)(1),
(2) Date: Jan. 15, 2019

(87) PCT Pub. No.: WO2018/177795
PCT Pub. Date: Oct. 4, 2018

(65) Prior Publication Data
US 2020/0008915 A1    Jan. 9, 2020

Related U.S. Application Data

(60) Provisional application No. 62/477,730, filed on Mar. 28, 2017.

(30) Foreign Application Priority Data

Jun. 2, 2017   (EP) .................................... 17174256

(51) Int. Cl.
A61C 19/00      (2006.01)
A61C 19/06      (2006.01)

(52) U.S. Cl.
CPC .................................. A61C 19/066 (2013.01)

(58) Field of Classification Search
CPC .... A61C 19/066; A61C 19/003; A61C 19/004
See application file for complete search history.

(56) References Cited

U.S. PATENT DOCUMENTS 4,553,936 A * 11/1985 Wang .................... A61C 9/0006
                                                  433/229
4,790,752 A * 12/1988 Cheslak ............... A61C 9/0006
                                                  433/229
(Continued)

FOREIGN PATENT DOCUMENTS

CN       201404306 Y       2/2010
DE       102012109602      8/2013
(Continued)

*Primary Examiner* — Ralph A Lewis

(57) ABSTRACT

The invention relates to a mouthpiece (100) for illumination of teeth, e.g. for teeth whitening. The mouthpiece comprises a slab shaped light guide (203), at least one light source arranged for injecting light into the light guide and an optically transparent element (101) arranged to contact the light guide. The optically transparent element has a lower refractive index than the light guide to enable total internal refection of the injected light. Light is coupled out of the light guide by an out-coupling structure (210) and through a part of the optically transparent part located between the light guide and the buccal side of the teeth to illuminated the teeth with uniform light.

18 Claims, 5 Drawing Sheets

(56) References Cited

U.S. PATENT DOCUMENTS

| | | | | |
|---|---|---|---|---|
| 4,852,549 A * | 8/1989 | Mori | ............. | A61N 5/06 |
| | | | | 607/92 |
| 4,867,682 A * | 9/1989 | Hammesfahr | ....... | A61C 9/0006 |
| | | | | 433/37 |
| 5,487,662 A * | 1/1996 | Kipke | ............. | A61C 9/0006 |
| | | | | 433/215 |
| 6,616,447 B1 | 9/2003 | Rizoiu et al. | | |
| 7,094,057 B2 * | 8/2006 | Friedman | ............. | A61C 19/003 |
| | | | | 433/140 |
| 9,889,315 B2 * | 2/2018 | Demarest | ............. | A61C 5/90 |
| 10,512,789 B2 * | 12/2019 | Newman | ............. | A61N 5/0603 |
| 2003/0157456 A1 | 8/2003 | Plocharczyk | | |
| 2007/0009856 A1 * | 1/2007 | Jones | ............. | A61C 17/20 |
| | | | | 433/215 |
| 2007/0224570 A1 | 9/2007 | West et al. | | |
| 2008/0063999 A1 * | 3/2008 | Osborn | ............. | A61C 19/063 |
| | | | | 433/29 |
| 2010/0151407 A1 | 6/2010 | Rizoiu et al. | | |
| 2012/0214122 A1 | 8/2012 | Dwyer et al. | | |
| 2016/0271415 A1 * | 9/2016 | Min | ............. | A61C 19/066 |

FOREIGN PATENT DOCUMENTS

| | | |
|---|---|---|
| RU | 2443396 C1 | 2/2012 |
| WO | 2006020128 A2 | 2/2006 |
| WO | 2006126155 A2 | 11/2006 |
| WO | 2006128021 A2 | 11/2006 |

* cited by examiner

TEETH ILLUMINATION DEVICE WITH A LIGHT CORE

CROSS-REFERENCE TO PRIOR APPLICATIONS

This application is the U.S. National Phase application under 35 U.S.C. § 371 of International Application No. PCT/EP2018/056921, filed on Mar. 20, 2018, which claims the benefit of European Patent Application No. 17174256.2, filed on Jun. 2, 2017 and U.S. Provisional Patent Application No. 62/477,730, filed on Mar. 28, 2017. These applications are hereby incorporated by reference herein.

FIELD OF THE INVENTION

The invention relates to teeth illumination devices and to oral care or hygiene devices such as teeth whitening devices.

BACKGROUND OF THE INVENTION

Oral care devices such as teeth whitening devices use light for illuminating the teeth. The light can be used for different purposes including teeth whitening in combination with a whitening gel or varnish, plaque or bacteria hygiene by use of disinfecting UV light or other purposes. In order to be effective, the intensity of the light need to be sufficiently high. It is also important that the light has a uniform intensity distribution over the teeth. In order to avoid damage of the pulp in the pulp chamber of the teeth it is also important that heating of the teeth is kept safely below a critical temperature.

Accordingly, there is a need for an oral care device which addresses one or more of these requirements. Accordingly, there is a need for an oral care device which is capable of illuminating the teeth with a sufficiently high intensity, with a uniform intensity distribution, and which only causes acceptable heating of the teeth.

There is also a need for oral care devices for home use. Accordingly, in order to make devices feasible for home use, manufacturing costs may be important and, therefore, a design which enables manufacturing for home use may be needed.

US2007/0224570A1 discloses a device that attaches to one or more light sources to transmit and distribute light energy simultaneously across the arches of upper and lower teeth for dental tooth whitening and photo initiation of light curing resins while at the same time retaining the benefits of the light sources to be used for individual tooth whitening and curing.

The inventor of the present invention has appreciated that an improved oral care device is of benefit, and has in consequence devised the present invention.

SUMMARY OF THE INVENTION

It would be advantageous to achieve an oral device capable of improving generation of a uniform light intensity at the teeth, alternatively or additionally capable of reducing heating of the teeth. In general, the invention preferably seeks to mitigate, alleviate or eliminate one or more of the above mentioned disadvantages singly or in any combination.

To better address one or more of these concerns, in a first aspect of the invention a mouthpiece for teeth illumination is presented that comprises:

- at least one slab shaped light guide, where each light guide comprises a first surface and a second surface located opposite to the first surface,
- at least one light source arranged for injecting light into each light guide,
- an optically transparent element arranged to contact at least a part of the first surface at one or more contact locations, where the optically transparent element has a lower refractive index than the at least one slab shaped light guide to enable total internal refection of the injected light at the one or more contact locations, and where at least a part of the optically transparent element is arranged to face the buccal side of the teeth, when the mouthpiece is in use, to enable transmission of light between the teeth and the at least one slab shaped light guide,
- an out-coupling structure arranged to redirect incident light in each light guide at a part of the second surface to enable transmission of at least a part of the redirected light through the first surface into the optically transparent element.

Advantageously, the light guide enables total internal reflection of the injected light at surfaces, i.e. at least at parts of the first surface, by means of the contact with the optical transparent element which has a lower refractive index. At the same time the optical transparent element provides transmission of out-coupled light from the light guide towards the teeth. Accordingly, the material for the optically transparent element may both have the function of a cladding for the light guide and transmission of light towards the teeth.

The light guide improves uniformity of the intensity distribution of light at the teeth since the injected light rays will be total internally reflected multiple times.

The out-coupling structure is arranged at a part of the second surface. Advantageously, if the out-coupling of light is only generated at a part of the second surface, or at a part of the surfaces of the light guide, the light in the light guide may travel a longer distance before it is coupled out via the out-coupling structure. The longer travel distance of light rays improve uniformity of the intensity distribution of light at the teeth.

Thus, when light is injected into the light guide, light rays will be total internally reflected at least at the first surface. Due to the total internally reflected rays, the rays will be mixed throughout the light guide to achieve an improvement of uniformity of light intensity. In order to couple the mixed light rays out of the light guide, the out-coupling structure redirects light at a part of the second surface. The scattered light rays will be transmitted through the body part of the light guide to the first surface where some of the scattered light rays will be experience total internal reflection while other rays will be transmitted through the first surface to the teeth via the optically transparent element.

According to an embodiment, the out-coupling structure is arranged to redirect different percentages of the incident light dependent on a location of the out-coupling structure at the second surface. Advantageously, by having a location dependent out-coupling percentage, the out-coupling structure can be configured to compensate the gradual decrease in light power in the wave guide caused by out-coupling of light, e.g. by increasing out-coupling as a function of the location on the waveguide.

According to an embodiment, the out-coupling structure comprises a plurality of individual out-coupling structures arranged at different locations at the second surface to redirect light. Advantageously, the individual out-coupling structures may be arranged to achieve variable out-coupling percentages, e.g. so that the out-coupling percentage for a given area of the second surface varies as a function of location at the second surface. Spaces between the individual out-coupling structures may provide total internal reflection, when the surface is in contact with a low-refractive-index material such as the optically transparent element.

For example, the individual out-coupling structures may be arranged to redirect different percentages of the incident light dependent on the locations of the out-coupling structures. The redirection of different percentages of the incident light may be achieved by arranging the individual out-coupling structures with different sizes, different spaces between adjacent individual structures or a combination thereof to provide the redirection of different percentages of incident light. Advantageously, variable sizes or spaces provides a simple manufacturing method for achieving variable out-coupling of light.

According to an embodiment, the out-coupling structure is arranged to redirect light by scattering, by specular reflection, by refraction or a combination thereof. Advantageously, the second surface of the light guide may be manufactured to generate scattering, reflection or refraction so that no other components are required. Alternatively, a separate component, e.g. a sheet of a material, which generates scattering, reflection or refraction may be connected with the second surface.

According to an embodiment, the out-coupling structure is arranged to redirect light only at the second surface. Since other surfaces are not used for generating redirection of light, theses surfaces can generate total internal reflection to improve uniformity of light.

According to an embodiment, the mouthpiece comprises at least one reflector arranged to reflect light transmitted through the second surface of each light guide back into the respective light guide. Advantageously, the reflector improves the efficiency of electric power to light irradiance at the teeth and thereby reduces heat generation from the light sources. For example, light reflected at the buccal side of the teeth may be transmitted through the light guide and the out-coupling structure. With the reflector, this light can be reflected back into the light guide.

According to an embodiment, the mouthpiece comprises at least one reflector arranged to reflect at least a part of the light transmitted through the first surface of each light guide back into the respective light guide. Advantageously, reflectors may be arranged at the first surface to at least partially reflect direct light from the light sources back into the light guide to limit formation of light intensity hot spots on the surface of the teeth. The reflectors may be partial reflectors to allow partial transmission of light.

According to an embodiment, the at least one slab shaped light guide constitutes two slab shaped light guides, where a plurality of the light sources are arranged between the two light guides for injecting light into both light guides. Advantageously, the light sources may be located between the light sources, e.g. at the occlusal plane, to reduce the height of the mouthpiece or to reduce the number of printed circuit boards for the light sources.

According to an embodiment, the light guide comprises at least one optical in-coupling element integrally formed with the light guide and arranged to couple light into the light guide. For example, the optical in-coupling element may be arranged at the longitudinal ends or along the longitudinal edges.

The at least one optical in-coupling element may be arranged to couple light into the light guide by changing beam divergence of the injected light from the at least one light source, and/or by reflecting the injected light received along a principal direction of each light source into a different direction in the plane of the light guide. Advantageously, reduction of the beam divergence improves the light efficiency since more of the light rays from the light sources will be total internally reflected. Advantageously, changing the direction of the light makes it possible to arrange the light sources in different ways to achieve an improved design or manufacturing process.

According to an embodiment, the mouthpiece comprises a sealing structure arranged for retaining an applied dental substance within a space defined by the optically transparent element, the sealing structure and the buccal side of the teeth. The sealing structure may be in the form of a rim arranged to contact the gums of the user so that a space is created between the surface of the light guide where light is transmitted towards the teeth, the rim and the buccal side of the teeth. Advantageously, the rim may be made of the same material as the optically transparent element, e.g. transparent silicone. The rim may be arranged to reflect light, e.g. by white paint or by making the rim from a non-transparent material such as a white material, to improve recycling of light reflected away from the teeth.

According to an embodiment, the light guide is at least partly enclosed in a body part of the mouthpiece, wherein the body part comprises the optically transparent element. The body part, which may form the optically transparent element, may have a lower refractive index than the light guide to enable total internal reflection at contact interfaces between the light guide and the body part, e.g. at locations other than the locations where light is coupled in or locations of the out-coupling structure.

A second aspect of the invention relates to use of a mouthpiece according to the first aspect for teeth illumination comprising the steps of:

arranging the mouthpiece so that the optically transparent element faces and extends along the dental arch of a user, and illuminating the teeth by light transmitted successively through the first surface of the light guide and the optically transparent element.

In summary the invention relates to a mouthpiece for illumination of teeth, e.g. for teeth whitening. The mouthpiece comprises a slab shaped light guide, at least one light source arranged for injecting light into the light guide and an optically transparent element arranged to contact the light guide. The optically transparent element has a lower refractive index than the light guide to enable total internal refection of the injected light. Light is coupled out of the light guide by an out-coupling structure and through a part of the optically transparent part located between the light guide and the buccal side of the teeth to illuminated the teeth with uniform light.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
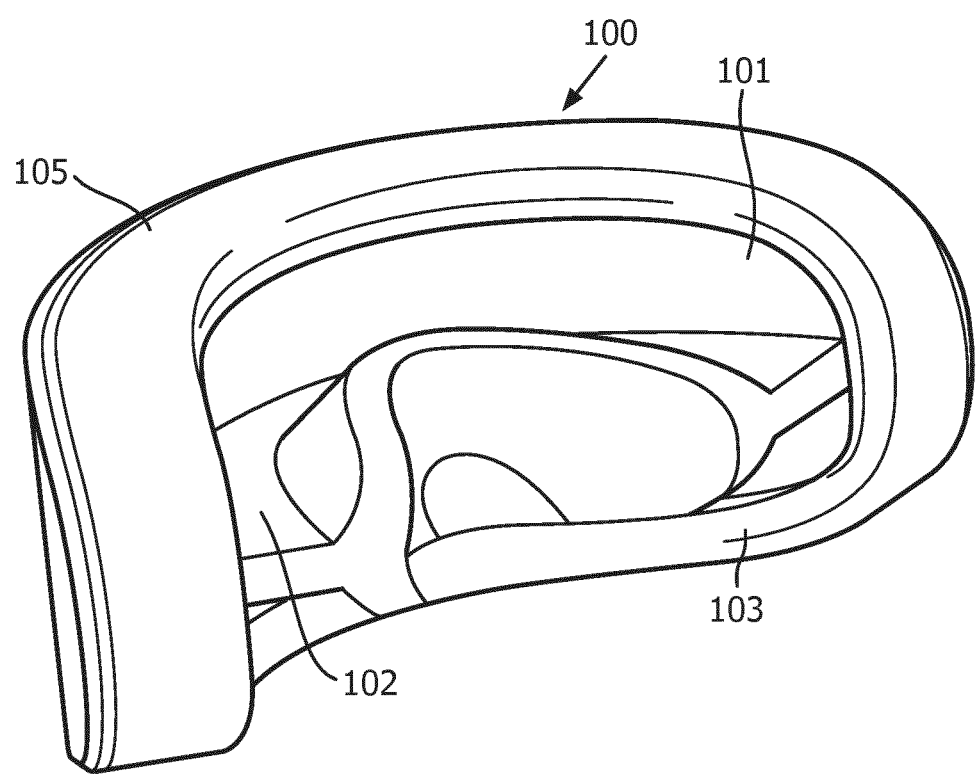
FIG. 1 illustrates a mouthpiece for use as a teeth illumination device.

FIG. 1 illustrates an embodiment of a mouthpiece 100 for use as a teeth illumination device. The teeth of a user may be illuminated for the purpose of teeth whitening, plaque or bacteria hygiene, or other oral hygiene or care uses. The mouthpiece may be a consumer product for home use or a professional product to be used by a professional, in both cases the user, i.e. the home user or the patient, is the person that receives the illumination from the device.

The mouthpiece 100 comprises an optically transparent element 101 arranged to face and to transmit light to the buccal side of the teeth. The optically transparent element 101 is encompassed by a body part 105 that comprises the mouthpiece 100.

According to an embodiment, the mouthpiece 100 comprises a protruding bite part 102 extending along at least a part of the optically transparent element 101. The bite part 102 extends outwardly to form bite surfaces, i.e. the illustrated plane of the bite part 102. The user can bite onto the upper and lower bite surface so that the upper and lower occlusal sides of the teeth contacts the bite surfaces. In this way the mouthpiece can be held in place in the mouth by applying a force from the teeth to the bite part 101.

According to an embodiment, the mouthpiece 100 comprises a sealing structure 103. The sealing structure 103 may be formed as a closed rim, as illustrated, which circumscribes the optically transparent element 101 and optionally the bite part 102. Alternatively, the sealing structure 103 may be formed as a rim with openings, e.g. near the end-surfaces of the bite part 102, so that the rim 103 partly circumscribes the optically transparent element 101. The sealing structure 103 may be shaped to contact gums of a user along the upper and lower dental arches. A function of the sealing structure 103 is to serve as a sealing structure for retaining an applied dental substance within a space defined by the optically transparent element 101, the sealing structure 103 and the buccal side 201a of the teeth 201 (see FIG. 2). Accordingly, the sealing structure 103 prevents leaking of the dental substance, e.g. teeth whitening gel or other dental substance. The optional bite part 102 may also be seen as a part of the sealing structure 103 since the bite part 102 restrains the location of the dental substance to above or below the occlusal plane 230.

A further function of the bite part 102 is to retain the shape of the mouthpiece 100 when a force is applied to the mouthpiece 100. E.g. when the mouthpiece 100 is too big for a user, the user applies a pressure to the mouthpiece 100 so that rim 103 makes contact with the gums.

The body part 105 and the optically transparent element 101 may be made from elastic materials like silicone or similar materials. For example, the optically transparent element 101 may be made from transparent silicone or other transparent polysiloxane polymers. The body part 105 and the optically transparent element 101 may be made from the same or from different materials. The body part 105 and the optically transparent element 101 may formed as a one-piece body, e.g. a one-piece body moulded from a single material.

The optically transparent element 101 is referred to as a transparent part, i.e. transparent in the sense the light is not scattered in the optically transparent element. However, in practice the transparent material of the teeth may contain irregularities, e.g. Particles, implying that some light scattering may take place. Accordingly, the optically transparent element may be referred to as an optically translucent element.

Figure 2A:
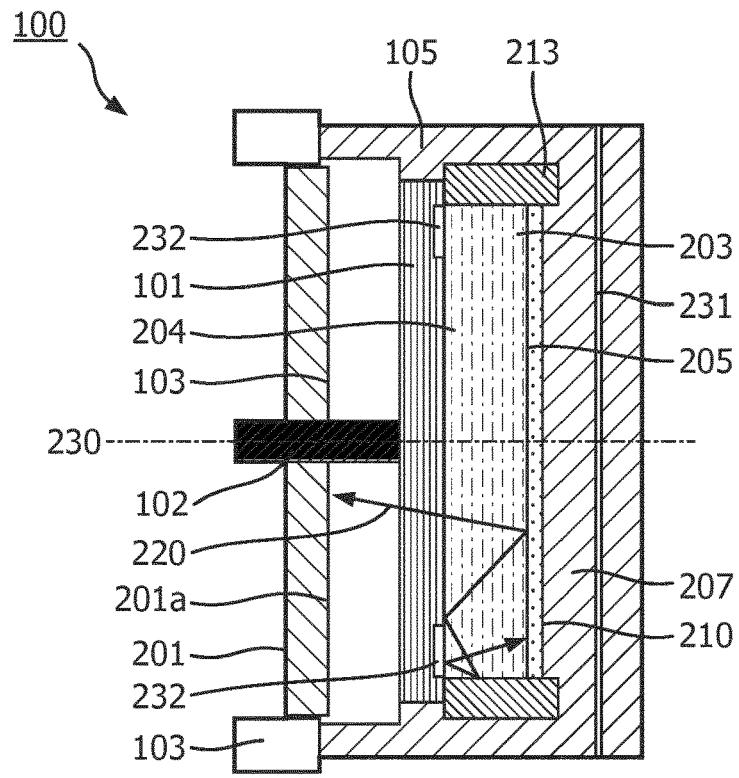
FIG. 2A shows a a cross-section of an embodiment of the mouthpiece with one light guide.

FIG. 2A shows a principal sketch of a cross-section of the mouthpiece 100 in a plane perpendicular to the bite surface of the bite part 102 and perpendicular to the occlusal plane 230.

FIG. 2A shows the optically transparent element 101 arranged to face the buccal side 201a of the teeth 201, i.e. Arranged so that an outer surface of the optically transparent element 101 faces the buccal side of the teeth 201. FIG. 2A further shows the bite part 102 and the rim 103.

The mouthpiece 101 further comprises a light guide 203 extending along the optically transparent element 101 and one or more light sources 213 arranged for injecting light into the light guide. The light guide comprises a first surface 204 and a second surface 205 located opposite to the first surface. The first surface 204 of each light guide 203 extends along the optically transparent element 101 so that at least a part of the first surface 204 of the light guide 203 contacts the optically transparent element 101. The light guide 203 has a refractive index which is higher than the refractive index of optically transparent element 101 to enable total internal refection of the injected light at locations where the light guide 203 contacts the optically transparent element 101. For example, the light guide 203 may be made from polycarbonate which has a higher refractive index than the material of at least the optically transparent element 101, which may be made from silicone. Alternative materials for the light guide 203 includes polymethylmethacrylat, cyclic-olefin polymers, cyclic-olefin copolymers, polyetherimide, styrene and polyesters like OKP-4.

In addition to provide light mixing via multiple internal reflections of the injected light, the light guide 203 is additionally arranged to transmit light to the optically transparent element 101 via the first surface 204. The optically transparent element 101 is arranged to transmit light from the light guide towards the teeth 201, particularly the buccal side 201a of the teeth.

The light guide 203 is generally slab shaped with a rectangular or elliptical cross-sectional shape or similar elongate cross-sectional shape, i.e. a cross-sectional shape in a plane perpendicular to the longitudinal length of the light guide. The elongate cross-sectional shape may have an extension which extends over the buccal surfaces of the teeth 201 along the upper and/or the lower dental arches, or a portion thereof. The elongate cross-sectional shape may improve the uniformity of light transmitted towards the teeth. In case of a rectangular shape, the first surface 204 may refer to one of the plane faces of the light guide. Generally, e.g. for elliptical cross-sectional shapes, the first surface 204 may refer to a portion of the surface arranged to face the buccal side of the teeth.

For reference purposes, the present description defines that the light guide 203 has a longitudinal extension along the dental arches, i.e. in a direction into the cross-sectional plane in FIG. 2A, and a vertical extension from the lower dental arch to the upper dental arch, i.e. from the bottom to the top of the light guide 203 in the cross-sectional view.

The combination of the body part 105 and the optically transparent element 101 may be formed to at least partly surround the light guide 203. Accordingly, the light guide 203 may be at least partly enclosed by the body part 105 and the optically transparent element 101.

The body part 105 may consist of different parts such as the optically transparent element 101, a back side 207, the bite part 102 and other parts. One or more of the body parts may be formed as separated parts of possibly different materials and subsequently connected, e.g. by means of an adhesive. Alternatively, one or more parts of the body part 105 may be formed as a one-piece body from a single material.

In addition to the optically transparent element 101 other parts of the body part 105 may be made from a material having a refractive index which is larger than the refractive index of the light guide 203. Accordingly, light rays 220 which hits the surface of the light guide 203 with a sufficiently high angle of incidence at a location where the surface of the light guide 203 is connected with the higher refractive index of the parts of the body part 105 and the optically transparent element 101 will be subject to total internal reflection. The minimum angle on incidence required for generating total internal reflection is governed by known optical laws. The angle of incidence is defined as the angle between the incident light ray and the normal to the surface at the point of incidence.

In an example, the optically transparent element 101 is arranged to surround the light guide 203, at least partially, so that contact locations between the light guide 203 and the optically transparent element 101 is established not only at the first surface 204, but, for example, also at the second surface 205 and/or edges of the light guide 203. According to this example, the optically transparent element 101 may constitute the body part or a part of the body part. Accordingly, light rays hitting the contact locations and having a sufficient high angle of incidence will be internally reflected.

In order to avoid the light being transmitted into the bite part 102 via the contact with the light guide 203 or the optically transparent element 101, the extension of the bite part 102 which contacts the light guide 203 or the optically transparent element 101 may be made diffusive or specular reflective in order to reflect incident light back into the light guide. Alternatively, the bite part 102 may be made from a material which scatters light, e.g. transparent silicone filled with scattering particles like TiO2 or other white material.

In order to couple light out of the light guide towards the teeth 201, the mouthpiece 100 further comprises an out-coupling structure 210 arranged to redirect light in the light guide at a part of the second surface 205 to enable transmission of at least a part of the redirected light through the first surface 204 into the optically transparent element 101. Some of the light rays 220 redirected by the out-coupling structure has an angle relative to the first surface 204 which is large enough to be coupled out through refraction, while other redirected rays 220 has an angle which is sufficiently oblique to be internally reflected. Thus, at least a part of the light redirected by the out-coupling structure 210 propagates from the second surface 205 to the first surface 204 through the thickness of the light guide between the first and second surfaces and propagates through the first surface 204 towards the buccal side 201a of the teeth 201.

Particularly, the out-coupling structure may be configured to redirect light only at the second surface 205, but not at the first surface 204. Accordingly, the out-coupling structure 210 may be arranged so that the first surface 204 is a non-scattering surface, i.e. so that light is transmitted through the first surface 204 by refraction.

The contact locations between the light guide 203 and the optically transparent element 101 or body part 105 may be established at locations at the second surface where out-coupling structures 205 are not present.

The out-coupling structure 210 may be made in different ways. For example, the out-coupling structure may be made by applying a paint, adhesive or other material at the parts of the second surface 205 where redirection, e.g. in the form of scattering, of the incident light is wanted. In another example, the out-coupling structures may be made by making the second surface 205 rough—e.g. by etching, sandblasting the surface or applying a molded scattering surface structure during molding of the light guide 203—at the parts of the second surface 205 where redirection or scattering of the incident light is wanted. In another example, the out-coupling structure 210 may comprise reflection structures arranged to couple light out by reflection. For example, reflection structures like prisms with plane surfaces arranged couple light out by specular reflections or reflection structures like reflective spheres arranged to couple light out by divergent or convergent reflection. The out-coupling structure 210 may comprise a combination of scattering and reflective out-coupling structures.

In general, the out-coupling structure 210 may be constituted by a part of the second surface 205 (e.g. an etched surface) or the out-coupling structure 210 may be a separate structure, e.g. a layer of paint printed on the second surface 205. In both cases, the out-coupling structure 210 is arranged opposite to the first surface 204.

The mouthpiece 100 may be configured with one or more reflectors 231, 232 arranged to reflect light transmitted through the first and/or second surfaces 204, 205 of the light guide back into the light guide.

One or more reflectors 232 may be arranged in front of the first surface 204, i.e. between the first surface 204 and the optically transparent element 101, to reflect light rays emitted directly from the light sources 213 at a large angle on incidence relative to the first surface. Such direct light rays would be transmitted through the first surface 204 without previous light mixing and could therefore create hot spots, i.e. high intensity levels as the ends of the light guide 203 where light is coupled in.

The reflectors 232 may be configured to reflect all incident light or a percentage of the power of the incident light. Thus, the reflectors 232 are generally configured to reflect at least a part of the light transmitted through the first surface 204 of the light guide 203 back into the respective light guide.

The dimensions of the front reflectors 232 in the vertical and longitudinal extensions of the light guide 203 may be determined so that light rays having an angle of incidence which is too large to be total internally reflected is reflected by the front reflectors 232. The front reflectors 232 may be arranged as individual reflectors, e.g. one for each light source 232, as elongate reflectors that extends along the longitudinal extension of the light guide 203 at the top and bottom. The front reflectors 232 may be formed by white paint printed onto the desired locations at the front surface 204, by reflective elements connected to the front surface 204, or by other means.

Additionally or alternatively, one or more reflectors 231 may be arranged behind the second surface 205, when seen from the first surface 204, e.g. between the out-coupling structure 210 and the back side 207. The back reflectors 231 reflect light, e.g. scattered light from the teeth 201 which is transmitted through the light guide 203 and the out-coupling structure 210 via the first surface 204 and subsequently the second surface 205. Additionally, the back reflectors 231 may be arranged to reflect direct light rays from the light sources which are transmitted through the second surface 205 due to a large angle of incidence. The reflectors 232 are preferably arranged to reflect all or substantially all light back into the light guide. The one or more back reflectors 231 may be formed as a reflective surface of the back side 207. For example, the back side 207 may be formed from an opaque material or a transparent material filled with scattering particles. In this case the surface of the back side 207 facing the second surface 205 may constitute the reflector 221. In another example, the back side 207 is formed from a transparent material. In this case the one or more back reflectors 231 may be formed by a reflective surface of the back side 207, e.g. a white-painted outer surface or other reflective material connected with the outer surface of the back side 207 or embedded in the back side 207.

Figure 2B:
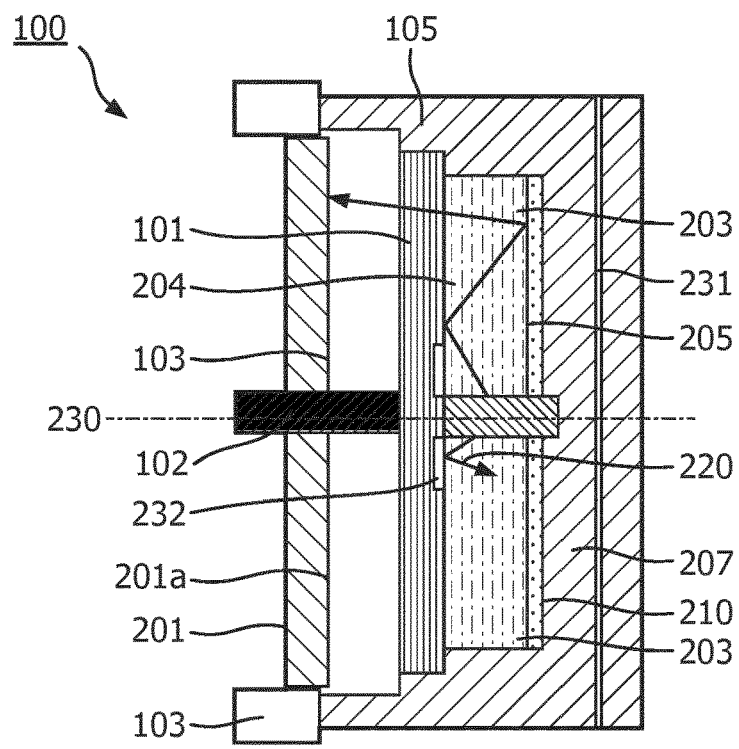
FIG. 2B shows cross-section of an embodiment of the mouthpiece with two light guides.

FIG. 2B shows an embodiment of the mouthpiece 100 comprising two slab shaped light guides 203 instead of the single light guide 203 in FIG. 2A. When the mouthpiece 100 is used, the upper light guide 203 mainly illuminates the upper dental arch and the lower light guide 203 mainly illuminates the lower dental arch. The two light guides may be illuminated by light sources 213 arranged at the top and bottom as in FIG. 2A. Alternatively or additionally, one or more light sources 213 may be arranged between the two light guides, e.g. in the occlusal plane 230 of the mouthpiece for injecting light into both light guides. For example, a row of light sources, such as LEDs, may be arranged to inject light into the upper light guide and another row of light sources 230 may be arranged to inject light into the lower light guide. Alternatively, a plurality of light sources may be arranged alternately to inject light into the upper and the lower light guide.

In the example in FIG. 2B the bite part 102 may extended through the width of the light guide 203 so that each light guide 203 extends from the top or bottom of the mouthpiece 100 to the bite part 102. The part of the bite part 102 which separates the two light guides 203 may be used to hold the light sources, e.g. for supporting a printed circuit boards to which the light sources 213 are connected. The surface of the extension of the bite part 102 which contacts the light guide 203 may be diffusive or specular reflective to prevent injection of light into the bite part 102.

Parts and elements of the embodiment of the mouthpiece 100 in FIG. 2B has the same function as corresponding parts and elements of the mouthpiece 100 in FIG. 2A.

Figure 3A:
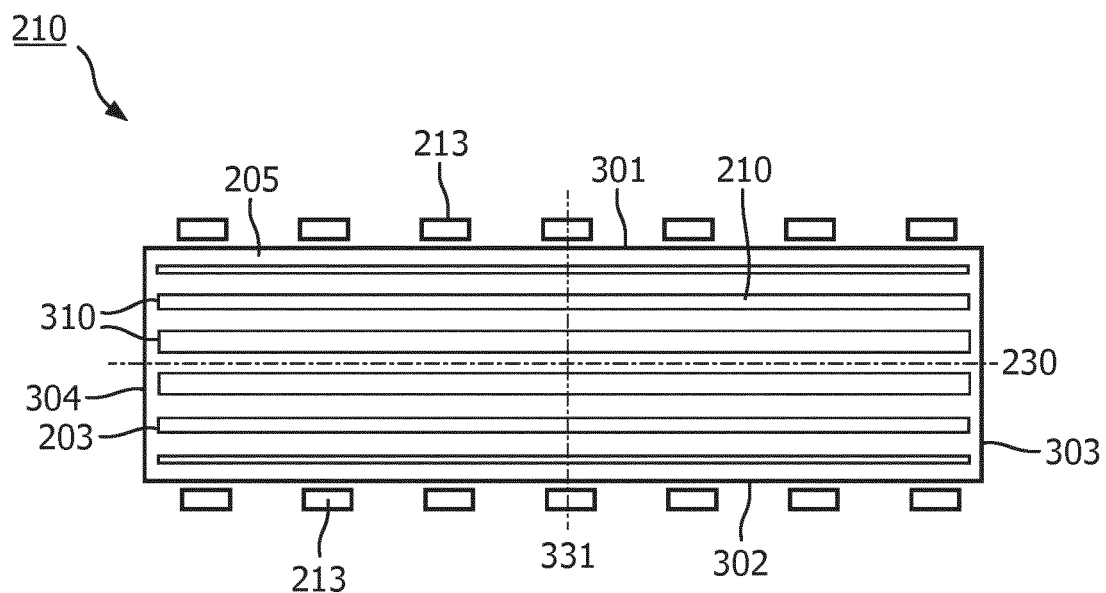
FIG. 3A illustrates an example of a structure comprising separated out-coupling structures.

FIG. 3A illustrates an example of the out-coupling structure 210 when seen towards the second surface 205. The out-coupling structure comprises a plurality of separated out-coupling structures, e.g. structures 310, arranged to scatter or redirect light at a plurality of separated locations at the second surface 205 of the light guide 203. As illustrated, at least some of the out-coupling structures can have different heights along the vertical direction 231 of the light guide 203, i.e. along the principal illumination direction of the one or more light sources 213. A plurality of light sources 213 are arranged along the elongate extension of the light guide 203 to inject light via the upper and lower elongate edges 301, 302 of the light guide 203.

The separated out-coupling structures 310 may have equal or different surface areas facing the second surface 205. For example, the different sizes in the form of different heights or surface areas of the out-coupling structures 310 may increase or vary dependent on the distance of an out-coupling structure 210 from one of the light sources 213. For example, the sizes of the separated out-coupling structures 310 may increase towards the occlusal plane 230 (if light sources 213 are arranged at the upper and lower edges) or towards one of the elongate edges (if light sources 213 are arranged only at the opposite elongate edge). For example, the sizes of the separated out-coupling structures 310 below the occlusal place 230 may increase towards the occlusal plane as the distance to the light sources 213 below the occlusal plane 230 increases.

The size of an out-coupling structures 310 facing the first surface 205 is the size responsible for scattering light at the second surface 205. For example, the size of the out-coupling structures 310 may be the area of a paint at a part of the second surface 205 where scattering is desired, the area of a rough surface part at the surface 205 or the area of reflecting surface.

By changing the size of the out-coupling structures dependent on the distance to the light sources 213, the probability that a light ray from a light sources 213 hits a location with an out-coupling structure increases along the principal direction of light propagation (here vertical direction of the light guide 203), i.e. increases as a function of the distance to the light source 213 so that light reaching the teeth becomes more uniform.

Alternatively or additionally to changing the size of the out-coupling structures 310, the out-coupling of light can be made dependent on the distance between a location along the light guide and the one or more light sources 213 by changing distance/spacing between adjacent individual structures, the density of the out-coupling structure 210, by changing shapes or patterns of the out-coupling structures, or a combination thereof, as a function of the location at the light guide 203. The density of the out-coupling structure may be varied e.g. by changing the density of a scattering structures applied to the the second surface 205, e.g. by applying a molded surface structure which varies along in a direction away from the light sources 213.

Thus, in general the out-coupling structure 210 may be configured so that the amount of light (e.g. the fraction or percentage of incoming versus redirected light) redirected by the out-coupling structure depends on the distance between a location along the vertical direction of the second surface 205 and the at least one light source 213.

In embodiment, where the at least one light source 213 is only placed along one of upper and lower elongate edges of the light guide 203, the out-coupling structure may be varied so that the probability that a light ray from a light source hits the out-coupling structure 210 achieves a maximum at the elongate edge without light sources 213.

As an alternative (not shown), the mouthpiece 100 may be configured so that the out-coupling structures 210 extend as longitudinal areas in a direction perpendicular to the occlusal plane 230, i.e. along the vertical direction. In this case, the size of out-coupling structures 310 increases along the longitudinal extension of the light guide 203 as the distance to the vertical side where the at least one light source 213 is arranged increases. The size of the out-coupling structures 210 may achieve a maximum at or next to the dental midline 331 or at the opposite side 402 (in case no light source 213 is arranged at that side). In this example, the one or more light sources 213 may be arranged along the left vertical side 304, along the right vertical side 303*d* or along both vertical sides.

Arrangement of the light sources 213 along the upper longitudinal side 301 and/or along the lower longitudinal side 302 may be preferred compared to arrangement of the light sources along the vertical directions 303, 304 in order to enable distribution of the light sources 213 over a larger area. The distribution over a larger area may reduce light intensity and thermal hotspots produced by the light sources. Furthermore, by arranging the light sources 213 along the upper and/or lower longitudinal sides 301, 302 the waste heat from the light sources is generated at a teeth area covered by gums where the blood profusion will function as a heat sink.

Figure 3B:
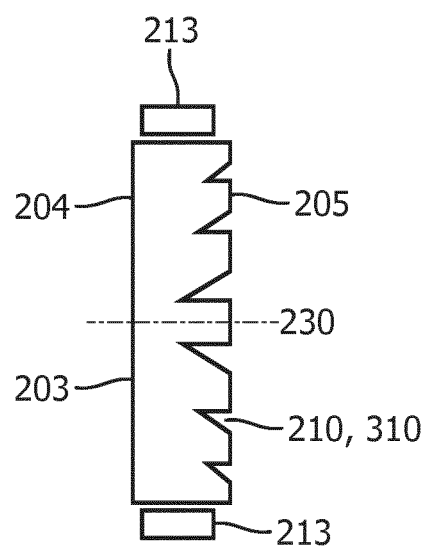
FIG. 3B illustrates an example of a structure in an embodiment where the out-coupling structure comprises reflective structures.

FIG. 3B shows a cross-sectional view of the light guide 203 in an embodiment where the out-coupling structure 210 comprises reflective structures 310 like prism-like structures or other structures like spherical structures. The percentage of incoming light rays which are reflected depends on the size of the reflective structures 310, here the area of the angled surfaces. The structures 310 may be diffuse reflective or specular reflective.

In general the out-coupling structure 210 may be arranged to redirect different percentages of incoming light dependent on a location of the out-coupling structure at the second surface 205, e.g. to provide a variable out-coupling of light so that the percentage of incoming light which is redirected increases as a function of distance from the light sources 213 or increases towards the occlusal plane 230. The variable out-coupling of light may be achieved by varying sizes, densities or other properties of the out-coupling structure 210 as described above.

Figure 4:
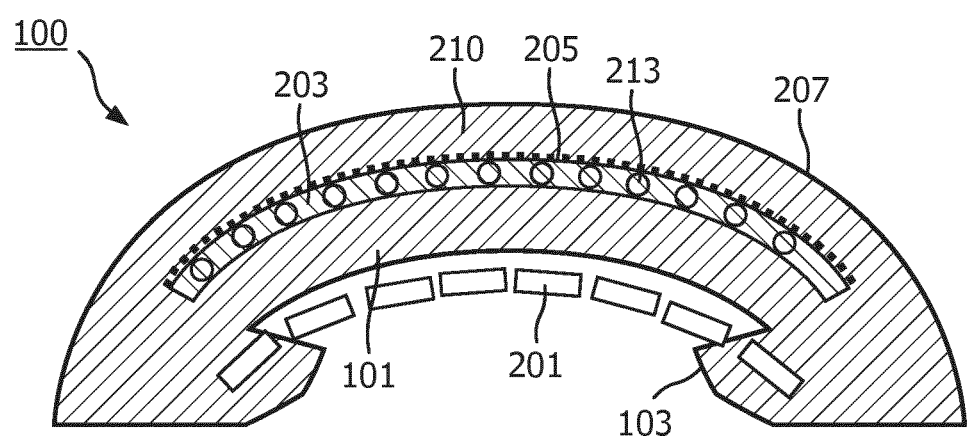
FIG. 4 illustrates a cross-sectional view of the mouthpiece in a plane parallel with the occlusal plane.

FIG. 4 shows a cross-sectional view of the mouthpiece 100 in a plane parallel with the occlusal plane. FIG. 3 shows a plurality of light sources 213 arranged along the longitudinal extension of the light guide 203 and along the dental arch of the teeth 201. For convenience, the bite part 102 is not visible in this view. The out-coupling structure 210 is principally shown as a dotted line. The optically transparent element 101, the rim 103 and the back side 207 are shown as a one-piece body made from a single material, but could also constitute separate parts of possible different materials.

Figure 5A:
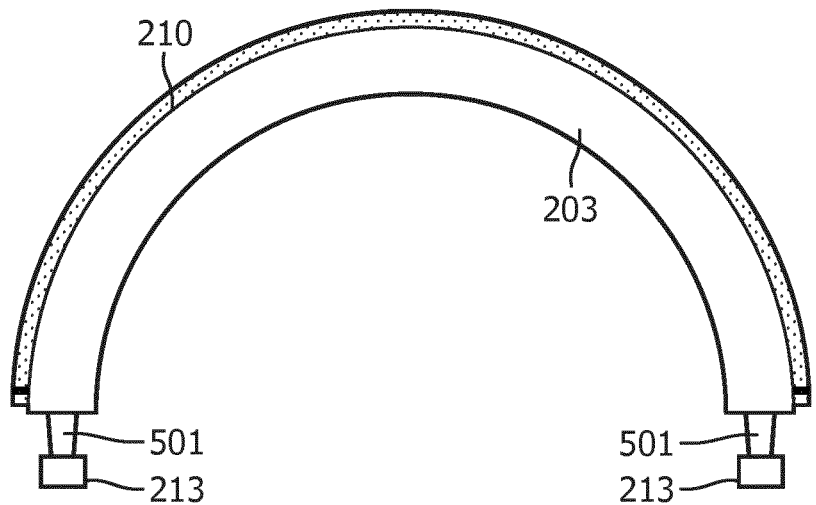
FIG. 5A shows an embodiment of the light guide configured with optical in-coupling elements for injecting light into the longitudinal ends of the light guide.

FIG. 5A shows an embodiment of the light guide 203 where the least one light source is arranged to inject light into the light guide 203 at the longitudinal ends. In coupling of light may be achieved by one or more optical in-coupling elements 501 integrally formed with the light guide, e.g. at the longitudinal ends. Accordingly, the light guide 203 and the in-coupling elements 501 may be formed as a one-piece body from the same type of transparent material, e.g. polycarbonate. For example, the optical in-coupling elements 501 may be configured as compound parabolic concentrators to couple light into the light guide by changing the beam divergence of the injected light from the light source 213. Accordingly, the in-coupling element 501 reduces the solid angle of light rays emitted by the light source 213. In this way, the incident angle of the light rays relative to the surfaces of the light guide is reduced so that more of the injected light rays will be internally reflected.

Figure 5B:
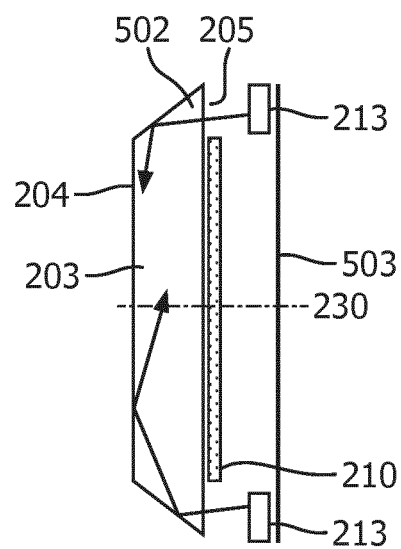
FIG. 5B shows an embodiment of the light guide configured with optical in-coupling elements for injecting light the lower and upper edges of the light guide.

FIG. 5B shows an embodiment of the light guide 203 where the least one light source 213 is arranged to inject light into the light guide 203 at the lower and upper edges, i.e. above and below the occlusal plane 230. The light guide 203 is configured with in-coupling elements 502. The in-coupling elements 502 and the light guide may be formed as a one-piece body similarly to the in-coupling elements 501 in FIG. 5A. The in-coupling elements 502 are configured to receive light through the second surface 205 and to reflect the received light to propagate vertically in the light guide. In general, the in-coupling elements 502 may be configured to reflect the injected light received along a principal direction of each light source 213 into a different direction in the plane of the light guide. Advantageously, the light sources 213, e.g. LED's, may be mounted and electrically connected to a common printed circuit board 503.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A mouthpiece for illumination of teeth, the mouthpiece comprising:
    at least one slab shaped light guide, where each slab shaped light guide comprises a first surface and a second surface located opposite to the first surface,
    at least one light source arranged for injecting light into each slab shaped light guide,
    an optically transparent element arranged to contact at least a part of the first surface at one or more contact locations, where the optically transparent element has a lower refractive index than the at least one slab shaped light guide to enable total internal refection of the injected light at the one or more contact locations, and where at least a part of the optically transparent element is arranged to face the buccal side of the teeth, when the mouthpiece is in use, to enable transmission of light between the teeth and the at least one slab shaped light guide,
    a bite part extending outwardly from at least a part of the optically transparent element, where the optically transparent element extends upward from the bite part to transmit light toward the upper dental arch and downward from the bite part to transmit light toward the lower dental arch,
    an out-coupling structure arranged to redirect incident light in each slab shaped light guide at a part of the second surface to enable transmission of at least a part of the redirected light through the first surface into the optically transparent element.

2. The mouthpiece according to claim 1, where the out-coupling structure is arranged to redirect different percentages of the incident light dependent on a location of the out-coupling structure at the second surface.

3. The mouthpiece according to claim 1, where the out-coupling structure comprises a plurality of individual out-coupling structures arranged at different locations at the second surface to redirect light.

4. The mouthpiece according to claim 3, where the individual out-coupling structures are arranged to redirect different percentages of the incident light dependent on the locations of the out-coupling structures.

5. The mouthpiece according to claim 4, where the individual out-coupling structures are arranged with different sizes, different spaces between adjacent individual structures or a combination thereof to provide the redirection of different percentages of incident light.

6. The mouthpiece according to claim 1, where the out-coupling structure is arranged to redirect light by scattering, by specular reflection, by refraction or a combination thereof.

7. The mouthpiece according to claim 1, where the out-coupling structure is arranged to redirect light only at the second surface.

8. The mouthpiece according to claim 1, where the mouthpiece comprises at least one reflector arranged to reflect light transmitted through the second surface of each slab shaped light guide back into the respective slab shaped light guide.

9. The mouthpiece according to claim 1, where the mouthpiece comprises at least one reflector arranged to reflect at least a part of the light transmitted through the first surface of each slab shaped light guide back into the respective slab shaped light guide.

10. The mouthpiece according to claim 1, where the at least one slab shaped light guide constitutes two slab shaped light guides, where a plurality of the light sources are arranged between the two slab shaped light guides for injecting light into the two slab shaped light guides.

11. The mouthpiece according to claim 1, where the at least one slab shaped light guide comprises at least one optical in-coupling element integrally formed with the at least one slab shaped light guide and arranged to couple light into the at least one slab shaped light guide.

12. The mouthpiece according to claim 11, where the at least one optical in-coupling element is arranged to couple light into the at least one slab shaped light guide by:

changing beam divergence of the injected light from the at least one light source, and/or reflecting the injected light received along a principal direction of each light source into a different direction in the plane of the at least one slab shaped light guide.

13. The mouthpiece according to claim 11, where the at least one optical in-coupling element is at a longitudinal end of the at least one slab shaped light guide.

14. The mouthpiece according to claim 1, comprising a sealing structure arranged for retaining an applied dental substance within a space defined by the optically transparent element, the sealing structure and the buccal side of the teeth.

15. The mouthpiece according to claim 1, wherein the at least one slab shaped light guide is at least partly enclosed in a body part of the mouthpiece, wherein the body part comprises the optically transparent element.

16. Use of a mouthpiece according to claim 1 for teeth illumination comprising the steps of:

arranging the mouthpiece so that the optically transparent element faces the buccal side of the teeth of a user, and illuminating the teeth by light transmitted successively through the first surface of the at least one slab shaped light guide and the optically transparent element.

17. The mouthpiece according to claim 1, where when the mouthpiece is in use the at least one light source comprises a first light source arranged to inject light into an upper edge of the at least one slab shaped light guide close to the upper dental arch, and a second light source arranged to inject light into a lower edge of the at least one slab shaped light guide close to the lower dental arch.

18. The mouthpiece according to claim 1, wherein the bite part forms bite surfaces for the upper and lower occlusal sides of the teeth when the mouthpiece is in use.

* * * * *